United States Patent
Daniel et al.

(10) Patent No.: US 11,846,645 B2
(45) Date of Patent: Dec. 19, 2023

(54) METHOD FOR DETERMINING CHARACTERISTICS OF SUPER-ABSORBENTS

(71) Applicant: BASF SE, Ludwigshafen (DE)

(72) Inventors: Thomas Daniel, Ludwigshafen (DE); Markus Toennessen, Ludwigshafen (DE); Christophe Bauduin, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 59 days.

(21) Appl. No.: 17/616,705

(22) PCT Filed: Jun. 24, 2020

(86) PCT No.: PCT/EP2020/067588
§ 371 (c)(1),
(2) Date: Dec. 6, 2021

(87) PCT Pub. No.: WO2021/001221
PCT Pub. Date: Jan. 7, 2021

(65) Prior Publication Data
US 2022/0317006 A1    Oct. 6, 2022

(30) Foreign Application Priority Data

Jul. 4, 2019 (EP) ..................... 19184461

(51) Int. Cl.
*G01N 5/02* (2006.01)
*G01N 15/08* (2006.01)
(52) U.S. Cl.
CPC ............. *G01N 5/02* (2013.01); *G01N 15/08* (2013.01); *G01N 2015/0866* (2013.01)
(58) Field of Classification Search
CPC ............ G01N 5/00; G01N 5/02; G01N 15/00; G01N 15/08; G01N 2015/0866
See application file for complete search history.

(56) References Cited

U.S. PATENT DOCUMENTS 5,624,967 A * 4/1997 Hitomi .................... A61L 15/24
521/64
7,420,018 B2 * 9/2008 Wada ....................... B01J 20/30
525/327.4

(Continued)

FOREIGN PATENT DOCUMENTS

CN    108871998 A  * 11/2018  ............... G01N 5/02
DE    3831272 A1     3/1990
(Continued)

OTHER PUBLICATIONS

Graham, et al., "Chapter 3: Commercial Processes for the Manufacture of Superabsorbent Polymers", Modern Superabsorbent Polymer Technology, ed. Buchholz, et al., 2nd Edition, 1998, pp. 71-103.
Granz, et al., "Quellungsexperimente mit Superabsorber-Polymeren", Chemie Konkret, vol. 20, Issue 3, Jun. 26, 2013, pp. 127-130.

(Continued)

*Primary Examiner* — Nguyen Q. Ha
(74) *Attorney, Agent, or Firm* — MARSHALL, GERSTEIN & BORUN LLP (57) ABSTRACT

In a method of measuring parameters of superabsorbents, the absorption capacity of superabsorbents is determined under pressure, by reducing the pressure applied to a sample of the superabsorbent stepwise and determining the absorption capacity at each pressure. In addition, the rise in absorption capacity after a reduction in pressure is measured as a function of time and this is used to calculate the swelling constant k or the characteristic swelling time τ. Swelling constant or characteristic swelling time or the magnitude of the difference in absorption capacity at two different pressures are used to determine further parameters of the superabsorbent.

16 Claims, 4 Drawing Sheets

(56) References Cited

U.S. PATENT DOCUMENTS

| | | | |
|---|---|---|---|
| 8,383,747 B2* | 2/2013 | Torii | C08F 20/06 526/89 |
| 8,999,884 B2* | 4/2015 | Haeberle | A61L 15/60 502/402 |
| 9,285,302 B2 | 3/2016 | Ehrnsperger et al. | |
| 10,323,105 B2* | 6/2019 | Yabuguchi | B01J 20/267 |
| 2018/0043052 A1 | 2/2018 | Bauer et al. | |

FOREIGN PATENT DOCUMENTS

| | | |
|---|---|---|
| EP | 0640330 A1 | 3/1995 |
| EP | 1516884 A2 | 3/2005 |
| EP | 1611949 A1 | 1/2006 |
| EP | 2535027 A1 | 12/2012 |
| WO | WO-2019/162216 A1 | 8/2019 |

OTHER PUBLICATIONS

International Search Report and Written Opinion for PCT Patent Application No. PCT/EP2020/067588, dated Oct. 9, 2020.

Lejcus, et al., "Swelling Behaviour of Superabsorbent Polymers for Soil Amendment under Different Loads", Polymers, vol. 10, Issue 3, Mar. 6, 2018, 13 pages.

Frank, "Superabsorbents", Ullmann's Encyclopedia of Industrial Chemistry, ed. Ley, et al., vol. 35, Jan. 15, 2003, pp. 213-232.

Pourjavadi, et al., "Taguchi optimized synthesis of collagen-g-poly(acrylic acid)/kaolin composite superabsorbent hydrogel", European Polymer Journal, vol. 44, Issue 4, Apr. 2008, pp. 1209-1216.

Kabacoff, "Chapter 8: Regression", R in Action, Data Analytics and Graphics with R, 2nd Edition, May 2015, pp. 167-211.

Zhang, et al., "Determination of the swelling behavior of superabsorbent polymers by a tracer-assisted on-line spectroscopic measurement", Polymer Testing, vol. 62, Sep. 2017, pp. 110-114.

* cited by examiner

METHOD FOR DETERMINING CHARACTERISTICS OF SUPER-ABSORBENTS

CROSS REFERENCE TO RELATED APPLICATIONS

This is the U.S. national phase of International Application No. PCT/EP2020/067588, filed Jun. 24, 2020, which claims the benefit of European Patent Application No. 19184461.2, filed on Jul. 4, 2019.

Background of the Invention

The present invention relates to a method of measuring the absorption capacity of superabsorbents under pressure. It further relates to the determination of swelling constant k and characteristic swelling time τ of the superabsorbent in question from the values measured, and to a method of determining parameters of the superabsorbent in question, by ascertaining the parameter by means of a correlation measured beforehand between swelling constant k and the parameter or by means of a correlation measured beforehand between characteristic swelling time τ and the parameter or by means of a correlation measured beforehand between the magnitude in the difference between two absorption capacity values ascertained at different pressures and the parameter.

Superabsorbents are used to produce diapers, tampons, sanitary napkins and other hygiene articles, but also as water-retaining agents in market gardening. Superabsorbents are also referred to as water-absorbing polymers.

The production of superabsorbents is described in the monograph "Modern Superabsorbent Polymer Technology", F. L. Buchholz and A. T. Graham, Wiley-VCH, 1998, pages 71 to 103.

DE 38 31 272 A1 discloses a method of measuring absorption rate by means of conductivity measurement.

ChemKon (Chemie konkret), volume 20, 2013, pages 127 to 130, describes the measurement of the swelling kinetics of superabsorbents by means of measuring absorbance with use of dextran blue. Polymer Testing, volume 62, 2017, pages 110 to 114, describes a very similar method. WO 2019/162216 A1 describes a method of measuring parameters of superabsorbents, by initially charging excess aqueous solution or dispersion, swelling the superabsorbent in the initially charged aqueous solution or dispersion while stirring, dissolving or dispersing at least one component A in the aqueous solution or dispersion and measuring the enrichment of the at least one component A the aqueous solution or dispersion during the swelling of the superabsorbent, wherein the enrichment of the at least one component A in the aqueous solution or dispersion is used to measure the time-dependent swelling characteristics, which is used to determine the swelling constant k or the characteristic swelling time τ, the parameter depends on the permeability of the superabsorbent and the parameter is ascertained by means of a correlation measured beforehand between swelling constant k and parameter or characteristic swelling time τ and parameter.

U.S. Pat. No. 9,285,302 B2 and its equivalent EP 2 535 027 A1 describe a method, referred to as the "K(t) method", of determining the dependence of permeability on time and the absorption kinetics of superabsorbents.

BRIEF SUMMARY OF THE INVENTION

It was an object of the present invention to provide an improved method of measuring the absorption capacity of superabsorbents under pressure. This method was especially to simplify and accelerate, in a simple manner, the measurement of absorption capacity at different pressure, and to be able to run in a substantially automated manner. Further objects of the invention are a method of determining swelling constant k and characteristic swelling time τ of the superabsorbent in question from the values measured in the determination of its absorption capacity at different pressures, and to a method of determining parameters of the superabsorbent in question, by ascertaining the parameter by means of a correlation measured beforehand between swelling constant k and the parameter or by means of a correlation measured beforehand between characteristic swelling time τ and the parameter or by means of a correlation measured beforehand between the magnitude in the difference between two absorption capacity values ascertained at different pressures and the parameter.

The object was achieved by a method of measuring the absorption capacity of superabsorbents under pressure, which comprises reducing the pressure applied to a sample of the superabsorbent stepwise during the measurement and determining the absorption capacity at each pressure and the dependence thereof on the measurement duration.

DETAILED DESCRIPTION OF THE INVENTION

The values measured can be used to ascertain swelling constant k and characteristic swelling time τ of the superabsorbent in question, and these values can in turn be used to ascertain other parameters of the superabsorbent in question by means of a correlation measured beforehand between swelling constant k and parameter or characteristic swelling time τ and parameter. In addition, such parameters can also be ascertained from the difference in the absorption capacity at two different pressures by means of a correlation measured beforehand between the magnitude of this difference and the parameter.

In the process of the present invention, the absorption capacity of a superabsorbent is determined for liquids under pressure. Such methods are known. For this purpose, a sample of a superabsorbent is initially charged under pressure in a test cell with a liquid-permeable base and is contacted with liquid through the base in such a way that the superabsorbent constantly sucks it in while swelling against the pressure applied, but is not forced hydrostatically into the test cell. The superabsorbent absorbs a certain amount of liquid which is determined gravimetrically and expressed in grams of liquid absorbed per gram of superabsorbent.

The method of the invention is applicable to all superabsorbents, especially to commercial particulate superabsorbents based on crosslinked, partly neutralized acrylic acid. Commercial particulate superabsorbents for use in hygiene products typically have a particle size distribution in which at least 95% by weight of all particles are within the particle size range from generally at least 50 μm, preferably at least 100 μm, to generally at most 1000 μm, preferably at most 850 μm. The method of the invention is suitable not just for the somewhat broader particle size distributions within this range that typically arise as a result of grinding, but also for very narrow particle size distributions within this range, as arise, for example, in the case of suspension, spray or dropletization polymerizations. Agglomerates within this particle size range that are also composed of smaller primary particles can also be analyzed by the method of the invention.

The superabsorbent generally has a permeability ("saline flow conductivity", "SFC", test method described below) of at least $10 \times 10^{-7}$ cm$^3$ s/g. In addition, it generally has a centrifuge retention capacity ("CRC", test method described below) of at least 10 g/g.

The amount of sample should be matched to the parameter to be determined and may differ from parameter to parameter. In general, in the method of the invention, sample amounts of at least 0.5 g, preferably at least 1 g, and at most 30 g, preferably at most 20 g and more preferably at most 5 g, of superabsorbent are adequate. The size and shape of the test cell can likewise be matched to the particle size to be determined. Typically, a cylindrical test cell having an internal diameter in the range from at least 5 cm to at most 7 cm is used, such that the sample covers a circular area having a diameter of at least 5 cm to at most 7 cm. A cylindrical geometry of the test cell is preferred, but it is also possible to use any desired other geometry—for example oval, square, triangular, hexagonal, star-shaped.

The duration of measurement at a given pressure is typically that necessary to attain a stable value. The value is stable especially when the values measured for a longer measurement duration cause no further statistically significant change in the accuracy of the consequent evaluation. In general, the measurement time is at least one minute, preferably at least 15 minutes, more preferably at least 30 minutes, and at most 240 minutes, preferably at most 120 minutes, more preferably at most 90 minutes. In most cases, a stable value has been attained after a measurement time of 60 minutes. Measurement at a given pressure level can also be ended automatically and flexibly after attainment of a stable value at a given pressure level, and the measurement commenced at the next pressure level.

In order to obtain comparable results, it is particularly important to use a defined liquid since the absorption capacity of superabsorbents depends greatly thereon. In order to model absorption capacity under realistic conditions of the use of superabsorbents, physiological saline solution (0.9% by weight aqueous sodium chloride solution) or a simulated urine solution of various salts is used.

By far the most widespread and customary test method for the absorption capacity of a superabsorbent for liquid under pressure is gravimetric determination of the absorption of superabsorbents under pressure ("absorption against pressure", "AAP", also "absorption under load", "AUL") by the standard method NWSP 242.0.R2 (15). This method is one of the customary standard test methods in this field of industry that are referred to as "NWSP" and are described in: "Nonwovens Standards Procedures", 2015 edition, published jointly by EDANA (European Disposables and Nonwovens Association, Avenue Herrmann Debroux 46, 1160 Brussels, Belgium, www.edana.org) and INDA (Association of the Nonwoven Fabrics Industry, 1100 Crescent Green, Suite 115, Cary, North Carolina 27518, U.S.A., www.inda.org). This publication is obtainable both from EDANA and from INDA.

In this method, the mass of 0.9% by weight aqueous saline solution absorbed by the superabsorbent tested under standardized test conditions, including the pressure applied, over the course of 60 minutes is determined gravimetrically.

The invention is described hereinafter with reference to this embodiment according to standard method NWSP 242.0.R2 (15). For details of measurement according to NWSP 242.0.R2 (15) that are not mentioned hereinafter, reference is made explicitly to the method description. Departures from NWSP 242.0.R2 (15) and the description that follows are possible, for example in the shape or construction of the test cell, the absorption liquid used, the measurement time or the pressure applied. In the specific case, however, the comparability of the results with the results from the standard method or other embodiments of the invention should be verified if results of different methods are to be compared. In general, any variances between different methods are correlated and can be corrected if required on the basis of prior comparative measurements in such a way that the results become comparable.

It is a departure from the exact specification NWSP 242.0.R2 (15) established in the field of industry to replace the petri dish containing the reservoir of liquid to be absorbed with an apparatus that keeps the liquid level constant in the plane to be established (surface of the glass frit) even over multiple measurements. This simplifies and accelerates the measurements of multiple samples in succession since, in this way, only the respective test cell with the sample has to be exchanged, but the adjustment of the liquid level has to be undertaken just once prior to successive measurements of a series of prepared test cells. A simple and known apparatus of this kind is a reservoir bottle with a base outlet that supplies the petri dish of specification NWSP 242.0.R2 (15) or a comparable vessel with liquid by means of a hose connection and in which the level of the liquid in the petri dish or the comparable vessel can be adjusted via the venting of the reservoir bottle by means of an immersed tube. Such an apparatus is shown, for example, in FIG. 1 of EP 1 611 949 A1, which, incidentally, is also an example of a modification of the apparatus according to specification NWSP 242.0.R2 (15) with which identical results to those according to specification NWSP 242.0.R2 (15) are also achieved with equal sample volumes, pressures and measurement times. The lower end of the vent tube in the reservoir bottle is always at the same level as the liquid level in the measurement apparatus, which can thus be adjusted by moving the vent tube in the reservoir bottle. Exploiting the same physical principle, the liquid level in EP 1516884 82 is also kept constant in a measurement apparatus by means of a reservoir bottle and immersed tube, but in that case the liquid level above the sample for determination of another property of the sample.

A further advantage of such a reservoir bottle for replenishing liquid is that the reservoir bottle can be placed on a balance and hence the amount of liquid absorbed by the sample can be directly determined gravimetrically. The connection to the reservoir bottle on the balance is chosen here such that it does not significantly distort the measurement by its own weight. A relatively thin silicon hose, typically in the order of magnitude of external diameter 6 mm, is of good suitability.

According to the method description, the AAP of a superabsorbent is determined to NWSP 242.0.R2 (15) under a pressure of 0.7 psi (49 g/cm$^2$, 4826 Pa), and gives the value typically referred to as "AAP 0.7 psi" or "AUL 0.7 psi". However, it is also possible to establish another pressure by varying the weight used in the measurement apparatus.

More commonly measured and reported is, in particular, the AAP 0.3 psi, which is determined analogously at a pressure of 0.3 psi (21 g/cm², 2068 Pa). Values at other pressures, for instance the AAP 0.1 psi (7 g/cm², 689 Pa) or AAP 0.9 psi (63 g/cm², 6205 Pa), are determined analogously by appropriate variation of the weight. Without weight, it is possible to determine an "AAP 0 psi" or AAP 0.0 psi (0 g/cm², 0 Pa). In this field of industry, the names with the pressure figure in the unit "psi" are the international standard, and so the repetition of the additional figures for metric values will be dispensed with hereinafter. The pressure figure is also always based solely on the pressure bearing on the superabsorbent as a result of the weight and not on absolute pressure or ambient pressure.

A preferred embodiment of the method of the present invention is in principle an AAP measurement according to NWSP 242.0.R2 (15), in which, however, an AAP value is first determined at a higher pressure, then the weight used in the measurement apparatus is reduced, in order to determine at least one further AAP value at a lower pressure. Preference is given to first determining the AAP 0.7 psi, then reducing the weight and determining the AAP 0.3 psi, and finally removing the weight and determining the AAP 0 psi. Moreover, what is determined is not just the total mass of saline solution absorbed after the respective measurement time—preferably 60 minutes—at the given pressure, but the mass absorbed is also registered as a function of time.

In order to enable the amount of liquid absorbed as a function of time, unlike in NWSP 242.0.R2 (15), the test cell is not weighed, and instead, in the apparatus according to NWSP 242.0.R2 (15), the petri dish used therein or another dish in which the test cell stands on a filter plate (method description, point 6.1) is connected by means of a communicating tube, preferably a hose, for example a silicone hose, to a reservoir vessel for the 0.9% by weight aqueous saline solution to be absorbed that stands on a balance, as described above and also shown, for example, in FIG. 1 of EP 1 611 949 A1.

In this way, it is possible to continuously gravimetrically detect the amount of liquid absorbed by the superabsorbent. This can be effected in a simple manner by using a digital balance that sends an output of the current weight of the bottle at regular time intervals to a computer, for example every second.

In a preferred embodiment of the invention, an immersed tube is used, the diameter of which, especially that at the lower end, leads not to "pulses" of large gas bubbles entering the reservoir bottle, but to a stream of fine gas bubbles. This avoids the fluctuations in the measurement from the balance that are caused by relatively large gas bubbles. Such distortions caused by abrupt pressure equalization in the bottle do not necessarily distort statistically evaluated measurements, but can make evaluation unnecessarily difficult, especially automatic evaluation. However, it is usually unnecessary to use a continuous capillary as immersed tube. For example, the immersed tube used is a glass tube that has been drawn out to a tip at its lower end. However, there are also other possible embodiments; for example, it is also possible to use a silicone hose with a stopper drilled through or generally any form of tube with a constriction. The optimal geometry can be adapted to the specific measurement setup and the acceptable degree of pulses in the gas supply by a few routine tests. However, it is necessary at any time for sufficient gas to be able to enter the reservoir bottle that the absorption rate for the liquid by the superabsorbent depends on the superabsorbent alone and not on the gas supply.

In the course of performance of the measurement, just as in the static procedure according to NWSP 242.0.R2 (15), it should be ensured that the liquid level in the petri dish or other dish is sufficiently high that the filter plate is soaked through thoroughly without liquid standing on the filter plate or even being forced hydrostatically into the test cell. The lower end of the immersed tube should therefore be adjusted in terms of its height by movement in the reservoir bottle or a change in height of the reservoir bottle such that, as described in NWSP 242.0.R2 (15), it stands at the level of the upper edge of the filter plate. In addition or instead, it is of course also possible to adjust the height of the measurement apparatus.

It should also be ensured that the upper edge of the filter plate, and hence also the petri dish or other dish, is horizontal. It is therefore usually advantageous when, as well as the adjustment in height of the liquid level, the petri dish or other dish can also be adjusted in terms of its height and further preferably also in terms of its inclination by means of a movable immersed tube in the reservoir bottle or a change in height of the reservoir bottle. In the simplest case, for this purpose, the test cell with the petri dish is placed on a labjack. However, individual height-adjustable feet are better. Such instrument feet are known and are standard for numerous pieces of equipment. For example, rotatable threaded bolts may be disposed in an internal thread of the frame, on the lower ends of which the construction stands. A frame with three feet of this kind is the easiest to adjust. This may also be a one-piece construction with the dish, in which filter plate and then thereupon the test cell are disposed.

The height of the liquid level is then set by adjusting the height of the lower end of the immersed tube in the reservoir bottle (or changing the height of the entire bottle), and the feet of the base construction of the test cell.

In an advantageous embodiment of the invention, the filter plate used according to the description of NWSP 242.0.R2 (15) (method description point 6.2) is replaced by a perforated plate. The perforated plate may be manufactured from any material that is neither soluble nor swellable in the liquid used for the inventive determination of absorptivity under pressure and is also corrosion-resistant to this liquid to such an extent that there is no distortion of measurements, nor any need to replace the perforated plate with undesirable frequency. It is possible in principle to use, for example, stone, ceramic, metal, wood, glass, quartz and plastic. The surfaces of the materials used may be coated, for example hydrophilized, enameled or antimicrobially coated. In order to be able to readily see impurities or air bubbles in the apparatus, transparent or see-through materials are preferred. Examples of these are polycarbonate, polymethacrylate, styrene-acrylonitrile copolymers, and transparent or see-through inorganic water-insoluble substances such as glass or quartz.

This perforated plate has a thickness of at least 3 mm, preferably at least 5 mm, and at most 20 mm, preferably at most 15 mm. The thickness is, for example, 6 mm or 10 mm.

The perforated plate has holes that permit unhindered passage of liquid to the test cell. The holes may be of any desired shape. Preference is given to round holes that are easy to produce by drilling and are also easy to clean. The holes generally have a diameter of at least 0.5 mm, preferably at least 1 mm, and at most 5 mm, preferably at most 3 mm. The diameter is, for example, 2 mm. If other hole cross section shapes are chosen, their size is generally chosen such that their opening areas correspond to the opening area of the holes with the diameter specified.

The distribution of the holes may be regular or irregular. A uniform distribution over the perforated plate is preferred. The number of holes and their shape and arrangement should be distributed over the perforated plate in such a way that, when the perforated plate is used, the same measurement results are obtained for a superabsorbent as using the glass frit according to NWSP 242.0.R2 (15). If these results—within the measured accuracy defined in NWSP 242.0.R2 (15)— are not attained, the number of holes should be increased, their distribution over the area of the plate should be homogenized and/or their cross section should be increased. If this reduces the ability of the perforated plate to bear the test cell to such an extent that its surface is no longer flat, its thickness should be increased.

Even if the measurements obtained with perforated plate and with glass frit according to NWSP 242.0.R2 (15) should not be identical for a superabsorbent, it is also sufficient for there to be a linear correlation of the measurements ascertained by perforated plate with the measurements ascertained according to NWSP 242.0.R2 (15). If the number, diameter and positioning of the holes in the perforated plate are chosen such that the correlation of the measurement results is linear and has a correlation coefficient ($r^2$) of at least 0.90, preferably at least 0.95 and most preferably of 0.98 to 1.00, there is a known fixed relationship between the results obtained by the two methods, such that they can be interconverted and evaluated.

Figure 1:
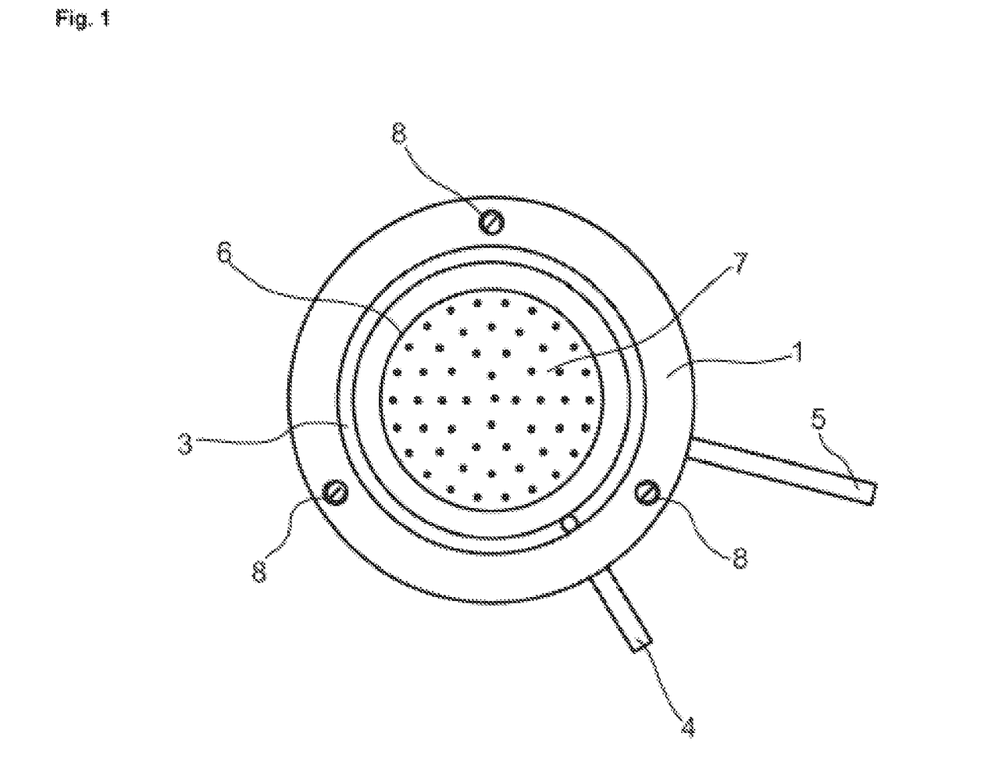
FIG. 1 is a top view of a measurement setup for determining the AAP value of a superabsorbent.

Good results have been achieved in the method of the invention with a perforated plate having the general shape of the perforated plate 7 shown in FIG. 1, which consists of Plexiglas of thickness 6 mm and, with a diameter of 89.5 mm, has been provided with 52 round holes (drillholes) arranged in concentric circles, each of diameter 2 mm.

Figure 2:
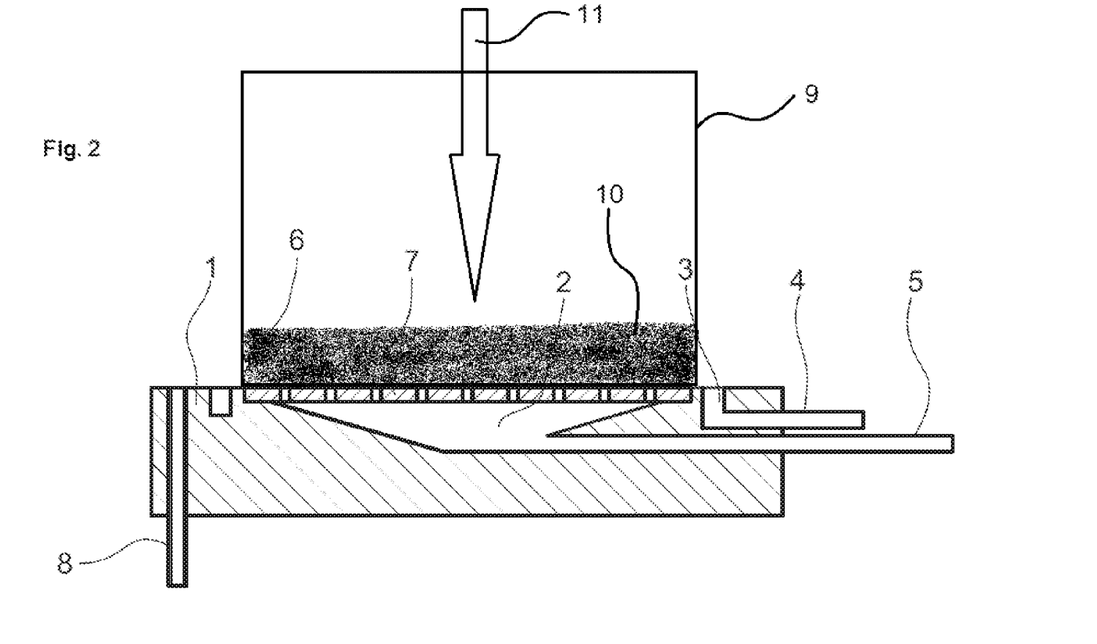
FIG. 2 is a cross section of the measurement setup for determining the AAP value of a superabsorbent.

FIGS. 1 and 2 show an illustrative construction of a base construction in a measurement setup to be used in accordance with the invention with an integrated dish and perforated plate.

FIG. 1 shows a top view, and FIG. 2 a cross section, of a body 1 with a central conical depression 2 which is connected at its lowest point to a feed tube 5 which is introduced into the body 1 through a lateral hole. An annular channel 3 around the central depression 2 is connected to an outlet tube 4 which is likewise introduced into the body 1 through a lateral hole. Around the central conical depression, the body has a collar 6 that serves as mount for a removable perforated plate 7. The depth of the collar is of the same size as the thickness of the perforated plate, such that the surface thereof lies in the plane of the surface of the body 1. Three threaded bolts 8 with a slot for a screwdriver at the upper end are disposed in threaded holes of the body, such that the body stands on these threaded bolts and it is possible to alter its height and align it horizontally by turning them by means of a screwdriver. It is of course also possible to use threaded bolts with grips or feet secured thereon that can be turned manually, or to undertake the height adjustment by means of a motor. Height adjustments other than threaded bolts may likewise be used. The manner of height adjustment is not essential to the invention, provided that the device is mechanically stable and alignable. Such height adjustment devices are known; examples are hydraulic devices, air cushions, liquid cushions, cog/rack devices, cables or electromagnetic devices.

FIG. 2 shows the device in cross section. By way of illustration here, unlike in FIG. 1, feed 5 and drain 4 and one of the threaded bolts 8 are shown in the plane of the cross section, but this is not a necessity for construction purposes and is disadvantageous if anything for the production and operation of the device for reasons of space.

The actual test cell 9 with the superabsorbent 10 is placed onto the perforated plate. The feed 5 is connected by hose to the reservoir vessel on the balance, and the drain 4 is likewise connected to a collecting vessel of sufficient size to accommodate unabsorbed liquid, ideally at least of the size of the reservoir vessel for liquid to be absorbed.

The dimensions of such a base construction should be adjusted with regard to the desired test cells. NWSP 242.0.R2 (15) stipulates a minimum diameter of the filter plate of 80 mm for a test cell of diameter 60 mm. For example, good results have been obtained for this test cell diameter with a perforated plate 7 of diameter 90 mm, disposed in a body 1 of diameter 160 mm. Preferably, the diameter of the drain 4 is greater than that of the feed 5. For the body 1 of diameter 160 mm mentioned by way of example, a feed of external diameter of 4 mm (to fit a silicone hose of external diameter 6 mm for connection to the reservoir bottle) and a drain of external diameter 6 mm have been found to be useful.

An experience-based method, well-established in practice, of verifying the correct adjustment of the liquid level in the embodiment of the invention with a perforated plate (especially a drilled Plexiglas plate) rather than the filter plate mentioned in NWSP 242.0.R2 (15) is to observe the droplets that form at the outlet of the holes on the top side of the plate on raising or lowering of the immersed tube in the reservoir bottle, the reservoir bottle and/or the dish (for instance the body 1 according to FIGS. 1 and 2) with the plate lying therein. If a filter paper, as also used according to the description of NWSP 242.0.R2 (15) (method description point 6.12) (standard laboratory "black band" filter paper is an example of a filter paper of good suitability), of the size and shape of the plate is laid onto the plate, the liquid that has passed through the holes in the plate is absorbed thereby. By weighing the filter paper, this amount of absorbed liquid can be determined. If it is between 1.5 and 2.5 g with a plate diameter of 90 mm after a contact time of the filter paper of 5 min, the height adjustment is correct. If it is lower than that, the dish is too high or the reservoir vessel or the lower end of the immersed tube is too low; if it is higher than that, the dish is too low or the reservoir vessel or the lower end of the immersed tube is too high. In the case of larger or smaller plates, the gram value should be adjusted correspondingly.

In a preferred embodiment of the invention, there is no need for the filter paper disposed between the filter plate and test cell according to NWSP 242.0.R2 (15). Especially in the embodiment with a perforated plate, for example a drilled plastic plate, it has not been found to be necessary.

The change in weight 11 after the respective measurement time—preferably 60 minutes—can be made by removing the weight used for the respective higher pressure and immediately placing on the weight for the respective lower pressure. It is possible to divide the weight such that only the portion corresponding to the extra weight for the higher pressure is removed. In the example of point 6.5 of NWSP 242.0.R2 (15) (for a plunger diameter of 59 mm), a weight of 1340 g is specified for the determination of AAP 0.7 psi, and a weight of 574 g for the determination of AAP 0.3 psi. In the method of the invention, it is accordingly possible (with this plunger diameter) to remove the weight of 1340 g after measurement for one hour and replace it with one of 574 g, but it is likewise possible to use a weight of 574 g and an additional weight of 766 g which is removed after the measurement of AAP 0.7 psi, leaving the weight of 574 g for subsequent measurement of AAP 0.3 psi in the cell. Other weights or combinations of weights for measurement at other or more than two pressures can analogously be calculated easily. For the final unweighted measurement ("AAP 0 psi" or "AAP 0.0 psi"), all weights are removed.

The material of the weights is largely immaterial. Metal weights are often used, especially weights made of stainless steel. It is not necessary for all weights or partial weights to consist of the same material. When partial weights are used, however, it may even be advantageous for the lowermost partial weight lying on the sample, i.e. that used for determination of AAP at the lowest non-zero pressure chosen, to be manufactured from plastic and the other weights, for saving of volume, from denser material such as metal, especially stainless steel. The production of the lowermost weight from plastic enables easier processing, especially shaping of the underside. It may also be advantageous to use a hydrophobic plastic in order to prevent sticking of swollen superabsorbent when this weight is removed. Suitable materials are, for example, polyhaloolefin polymers, for instance partly or fully fluorinated polymers such as PTFE (e.g. Teflon®) or else fluorinated partly alkoxylated polymers such as PFA (e.g. Teflon®-PFA).

The sample remains the same sample, meaning that it is not exchanged when the pressure level is changed; instead, the measurements at the individual pressure stages are executed successively with the same sample in the same test cell.

The change in pressure in the method of the invention can be automated efficiently. For example, the weight can be exchanged by a robot arm, or the additional weight used for the previous, higher pressure level can be removed thereby. It is also possible to replace the weight with a mechanically, hydraulically or electrically driven plunger that presses against the test cell with an appropriate weight.

In the method of the invention, the pressure in the test cell is constantly lowered between the individual pressure levels. Once a superabsorbent has absorbed liquid, it does not readily release it again; moreover, in the test cell used in the method of the invention, liquid offered is absorbed, but once therein it would not, or at least not completely, be forced back into the reservoir bottle on the balance and hence would not be correctly detected in the measurement, even if the superabsorbent were to release it again to a corresponding degree when the pressure is increased.

In a preferred embodiment of the invention, a filter paper or another thin nonwoven of the same area and shape as the inside of the test cell is placed onto the superabsorbent sample in the test cell, i.e. a circular filter paper having the internal diameter of the test cell in the case of a typically cylindrical test cell. For this purpose, a filter paper like that in NWSP 242.0.R2 (15) (method description point 6.12) is used. An example of a filter paper of good suitability is standard laboratory "black band" filter paper. Experience has shown that the amount of liquid absorbed by the filter paper is so small compared to that absorbed by the superabsorbent that it does not it significantly distort the measurement.

Moreover, in a preferred embodiment of the invention, a spacer is disposed between the underside of the weight and the superabsorbent or the filter paper lying thereon, the effect of which is that the weight does not lie entirely planar on the superabsorbent or the filter paper. In principle, an adequate spacer is at least one object that establishes a gap between filter paper and weight at at least one point, but, for avoidance of distortions, does not itself absorb any liquid and is preferably of such a low weight that the measurement is not distorted beyond its customary range of error; otherwise, the pressure generated by the weight of the spacer on the sample has to be included in the calculation for the measurement or compensated for by lower weight and the spacer has to be removed for measurement of an AAP 0.0 psi. In the simplest case, an adequate spacer is merely a piece of thin wire, preferably bent, for example one or more paperclips, between the filter paper and weight. Preferably, however, the underside of the weight or plunger by which it is in contact with the superabsorbent or filter paper has a correspondingly nonplanar configuration, such that elevations are present as spacer. This is effected, for example, by machining parallel or concentric grooves. Suitable grooves are those of depth at least 1 mm, at most 5 mm, for example 2 mm, that are spaced apart from one another at least by 0.5 mm, at most 5 mm, for example 2 mm. The flanks of the grooves may be at right angles to the surface, but may also have flatter angles, provided that they are not so flat that filter paper adheres again when the plunger is raised. For example, good results have been obtained with plungers having parallel grooves of width 2 mm, depth 2 mm and separation 2 mm on their underside. If partial weights are used, it is sufficient to configure the underside of the lowermost partial weight, i.e. that used for determination of the AAP at the lowest non-zero pressure chosen, with a spacer in such a way.

The two latter measures, namely the filter paper between superabsorbent sample and weight or plunger and the spacer on its underside, prevent the sticking of swollen superabsorbent to the underside of the weight or plunger when it is raised. In the determination of the "AAP 0.0 psi", i.e. the absorption capacity of the superabsorbent without compressive stress on conclusion of the measurement, this sticking would easily lead to distortions of this value. If no "AAP 0.0 psi" is determined, these two measures make no contribution to the measurement and are therefore dispensable, but they do not, or at least do not significantly, distort the measurements under pressure.

It may also be advantageous for handling to cut the outer edges of the underside of the plunger or weight, i.e. to to taper them all round, for example at an angle of 45°.

Experience has shown that the cumulated liquid masses, in each case after 60 minutes at one pressure, measured by the method of the invention in the embodiments respectively preferred over the description of NWSP 242.0.R2 (15) (including the perforated plate made of Plexiglas with thickness 6 mm, a diameter of 89.5 mm, with 52 aholes arranged in concentric circles, each of diameter 2 mm) correspond to the values obtained at the same pressure when measuring exactly according to NWSP 242.0.R2 (15) with a variance of not more than 0.5 g/g.

The swelling constant k or the characteristic swelling time $\tau$ of the superabsorbent examined can be calculated from its time-dependent swelling characteristics according to $Q(t)=Q_{max}(1-e^{-kt})$ or $Q(t)=Q_{max}(1-e^{-t/\tau})$, where $Q(t)$ is the liquid absorption of the superabsorbent at time t and $Q_{max}$ is the maximum liquid absorption of the superabsorbent at a given pressure, which is generally attained after a measurement time t of at least 4 $\tau$, preferably at least 5 $\tau$. In general, in the case of standard superabsorbents, a measurement time of at most 90 minutes, usually even one of at most 60 minutes or at most 30 minutes, is sufficient to achieve and to surpass this minimum duration of the measurement time. Preference is given to measurement at a given pressure for 60 minutes. After this measurement time, all practical experience shows that there is no longer any measurable or at least any significant change in the value of $Q_{max}$. If there should indeed, in theoretically possible exceptional cases, be any significant change therein even after this measurement time, the measurement time should be correspondingly extended.

The evaluation can be effected after linearization of the equations by graph methods using a line of best fit with slope −k or −1/τ or by means of a regression tool included in standard computer software from a regression of the measurement data with the above equation.

This can already be calculated from the series of measurement points ascertained in the first swelling, i.e. at the highest pressure.

Figure 3:
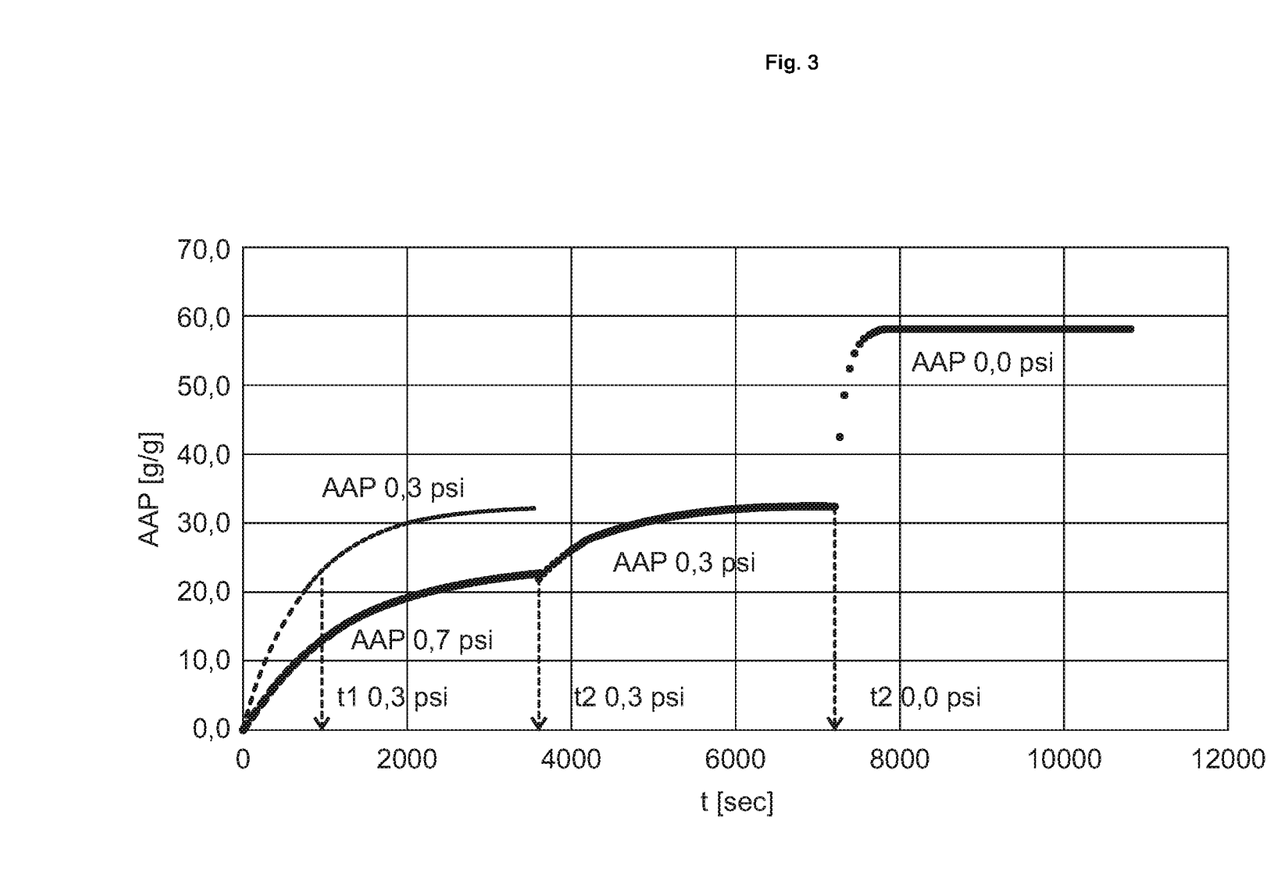
FIG. 3 is a graph of AAP (g/g) vs. T(sec) at AAP AAP (0.7 psi), AAP (0.3 psi), and AAP (0.0 psi)

It is also possible to evaluate the data measured at respectively lower pressure by the same principle. For this purpose, the individual curves are divided into their individual sections—one per pressure stage—by the equation $Q(t)=Q_{max}(1-e^{-(t-t2+t1)/\tau})$. As above, Q(t) is the liquid absorption of the superabsorbent at time t and $Q_{max}$ is the maximum liquid absorption of the superabsorbent at a given pressure, k is the swelling constant and τ is the characteristic swelling time, and t2 is the time of lowering of the weight. Time t1 is the virtual starting time for the respective subsequent section of the measurement curve that would give the absorbed volume attained at time t2 without any change in weight. Thus, for the superabsorbent examined, the characteristic parameters and the corresponding r values for the respective curve sections are determined. An example of such an evaluation is illustrated in FIG. 3 for the measurement after the first lowering of weight. FIG. 3 shows the measurements of a sample in the AAP determination of the invention with weights that lead to determination of an AAP 0.7 psi (first section, t=0 to 3600 s), AAP 0.3 psi (middle section, t=3600 to 7200 s) and AAP 0.0 psi (last section, t=7200 to 10 800 s). The time t2 0.3 psi is the time of first lowering of the weight, i.e. the actual commencement of the measurement of AAP 0.3 psi. The time t1 0.3 psi is the (virtual) time at which, in the case of measurement of AAP 0.3 psi alone, the same amount of liquid would have been absorbed as was already absorbed in the measurement at time t2 0.3 psi being undertaken here. This means that the portion of a measurement curve for a pure AAP 0.3 psi measurement, which is absent here owing to the prior measurement of the AAP 0.7 psi, can be added by calculation and the entire curve can be evaluated. This is effected analogously for further sections of the measurement curve. The curve sections measured at a lower pressure than that of the first pressure level are thus supplemented, by regression with the above formula, with the missing portion of the respective curve by comparison with a curve measured from the start at the respective pressure level, and shifted to the left toward the origin of AAP and t. The curves thus obtained for the individual pressure levels correspond to the curves that would be obtained in the case of separate individual measurement at the individual pressure levels, and can likewise be evaluated.

The method of the invention exploits the fact that a swelling superabsorbent, in the case of stepwise reduction of the external pressure that limits the swelling, produces a characteristic swelling curve analogous to that shown in FIG. 3, the shape and properties of which correlate with other parameters of the superabsorbent that can be ascertained only in a laborious manner, especially those dependent on the permeability of the superabsorbent. This permits relatively simple automation of the measurement for indirect ascertaining of the parameters sought. The parameters sought can also be correlated via image analyses of the swelling curves measured in accordance with the invention.

The parameter to be determined in accordance with the invention is, for example, the time for the swelling of a layer of superabsorbent particles by a particular value. Parameters of this kind are described as T5, T10 and T20 values in the test method "K(t) Test Method (Dynamic Effective Permeability and Uptake Kinetics Measurement Test Method)" described on pages 13 to 18 in EP 2 535 027 A1. A further example of a parameter to be determined in accordance with the invention is the permeability of the superabsorbent as can be determined, for instance, as SFC (saline flow conductivity).

A further possible, particularly simple and preferred basis for an evaluation method for practical use is the magnitude of the difference between the absorption capacity measured in accordance with the invention at two different pressures. Preference is given to the use of the magnitude of the difference between the absorption capacity at a non-zero pressure and without pressure. The absorption capacity at lower pressure is generally higher than that at higher pressure, and so the magnitude is ascertained by subtracting the absorption capacity at higher pressure from that at lower pressure. For example, what is accordingly ascertained is the difference between AAP 0.0 psi and at least one further AAP measured under higher pressure, for example the AAP 0.3 psi or AAP 0.7 psi. This magnitude of the difference can in many cases be correlated in a simple manner with a parameter being sought in a linear or non-linear manner. This absorption capacity of a superabsorbent at different pressures and hence also the magnitude of the difference therein can be ascertained easily and with good precision, while the direct determination of a parameter sought can entail much greater experimental complexity and costs. The high precision of the determination of the absorption capacity at different pressures and of the magnitude of the difference therein is also caused by the continued use of the same superabsorbent sample across all the pressure levels since all that changes is the weight, but there is no exchange of the sample to be measured as would be the case in standard test methods.

The correlation (calibration curve) between parameter and swelling constant k or characteristic swelling time τ or the magnitude of the difference in the absorption capacity at two different pressures is ascertained by measuring the parameter of at least three superabsorbents having different permeability and additionally ascertaining the swelling constant k or the characteristic swelling time τ or the magnitude of the difference in the absorption capacity at two different pressures. The accuracy of the correlation can be increased by increasing the number of superabsorbents of different permeability measured. The evaluation can be effected by graph by means of a line of best fit, or by means of a computer program.

The parameter of the superabsorbent used to establish the correlation should cover a range of preferably ±10%, more preferably ±25%, most preferably ±50%, from the average. When the parameter is correlated to the permeability and superabsorbents of different permeability are accordingly to be used to ascertain the correlation, such superabsorbents of different permeability may be produced by varying the amount of surface postcrosslinker in the surface postcrosslinking. They should otherwise have maximum structural similarities, and especially come from the same production process, i.e. all from a kneader or dropletization or suspension or belt polymerization process, with comparable aftertreatment. Surface postcrosslinking is described, for example, in the monograph "Modern Superabsorbent Polymer Technology", F. L. Buchholz and A. T. Graham, Wiley-VCH, 1998, pages 97 to 101.

The present invention is based on the finding that there is a correlation between the swelling constant k or characteristic swelling time $\tau$ and permeability-dependent parameters. The present invention is also based on the further finding that there is likewise a correlation between the magnitude of the difference in the AAP values ascertained under different pressures and the permeability, or parameters that correlate with the permeability.

Permeability describes the permeability of swollen superabsorbent layers to aqueous solutions. A high permeability of the superabsorbents is important for diapers having a high proportion of superabsorbents. Permeability can be measured, for example, as saline flow conductivity (SFC) or gel bed permeability (GBP).

The swelling of superabsorbent layers is always also affected by the permeability of the superabsorbent used. A comparatively impermeable superabsorbent layer prevents the passage of aqueous solution and hence the complete swelling of the superabsorbent. Such a parameter is, for example, the liquid absorption of 20 g/g (T20) as per the "K(t) Test Method (Dynamic Effective Permeability and Uptake Kinetics Measurement Test Method)" described in EP 2 535 027 A1 on pages 13 to 18.

The individual steps of the test method can be easily automated. In addition, the test method enables the simultaneous measurement of further parameters of the superabsorbent by a single measurement. Thus, the method of the invention enables inexpensive routine analysis, especially in the continuous production of superabsorbents.

A further parameter that can be easily determined by correlation in accordance with the invention from absorption capacity values ascertained in accordance with the invention is the gel strength. The known physical model set up by F. L. Buchholz has been found to be useful for the modeling of the swelling characteristics of a superabsorbent (see "Modern Superabsorbent Polymer Technology", F. L. Buchholz and A. T. Graham, Wiley-VCH, 1998). The gel strength of the gel completely swollen without external pressure ($G_e$) is a central value in this model. The gel strength ($G_e$) is a measure of the stiffness of the gel completely swollen without external pressure, i.e. at the theoretical maximum degree of swelling $Q_e$. The degree of swelling $Q_e$ is attained only after an infinitely long swelling time, and so the CRC is used instead in practice, in a good approximation. In the case of very slow-swelling superabsorbents, for which no stable final value for the CRC has yet been attained after the customary 30 minutes, the CRC can also be measured for this purpose with a swelling time of more than 30 min.

Alternatively, CRC and degree of swelling can also be determined by the method disclosed in WO 2019/162216 A1. Before any comparison of CRC and degree of swelling figures determined by different methods, it is necessary to check whether mutually consistent values are also obtained in the practical execution of these methods; preference is given to including only values determined by the same method in comparisons.

Unfortunately, $G_e$ nevertheless cannot be determined experimentally in a simple manner, and so this value is typically attained using a series of conventional measurements of CRC, AAP 0.0 psi, AAP 0.3 psi and AAP 0.7 psi. $G_e$ is calculated here from these many measurements by means of non-linear regression, employing the corresponding equations from the Buchholz model. For this purpose, the parameters mentioned must be measured for each superabsorbent manually and as per the specification, at least as a double determination. This is laborious, and since a new small sample has to be taken for each measurement, also unnecessarily prone to error. By contrast, it is possible to determine the gel strength by means of the method of the invention merely by measurement of the CRC and the inventive measurement of the absorption capacity (AAP) at different pressures of at least two samples, since, in accordance with the invention, the AAP values at different pressures are measured on the same sample. In addition, the characteristic swelling times are also obtained as a result in accordance with the invention. According to the invention, gel strength ($G_e$) can subsequently be ascertained from a simple linear regression of the gel strength ($G_e$), once ascertained using comparative samples by a previously known method, against the difference in the AAP 0.0 psi measured in accordance with the invention and the AAP 0.7 psi measured in accordance with the invention.

Modeling and calculation according to Buchholz moreover requires the gel bed porosity value without external pressure ($\phi_0$) at the ultimate degree of swelling ($Q_e$, again typically replaced in practice by the CRC). This can be estimated, for example, by: $\phi_0 = (AAP\ 0.0\ psi - CRC)/AAP\ 0.0\ psi$. It is a measure of the proportion by volume of open pores in the swollen gel that are available for conduction of liquid that has entered the already swollen gel bed.

Preferably, for establishment of a correlation to determine parameters, more than one parameter determined in accordance with the invention is used in a multiple linear regression formula. The permeability of a swollen superabsorbent also depends on its particle shape and particle size distribution. The use of multiple parameters in a multiple linear regression therefore nevertheless permits prediction of parameters such as SFC with high accuracy. In a preferred form, magnitudes of measured differences of absorption capacities and/or swelling times r are used for the purpose. In this way, universally usable mathematical models are obtained, which do not depend on a particular particle shape or particle size distribution.

Multiple linear regression is known. One example of a program suitable for the inventive analysis of the data ascertained in accordance with the invention is, for instance, the programming language R, obtainable in the current version 3.6.1 (2019-07-05) under open source licence from "The R Foundation for Statistical Computing" (www.r-project.org). For the non-linear fit of the partial curves after curve division—as shown in FIG. 3—the function nlm( ) can be used in R in combination with the mean absolute error (MAE) over all measurement points. A suitable multiple linear model can be calculated in R by means of the function lm( ). An overview of multiple linear regression with R can be found, for example, in "R in Action", 2nd edition, Robert I. Kabacoff, Manning Publications Co.—Shelter Island NY, ISBN 9781617291388, chapter 8. MAE is explained on page 355 therein. The elucidation of the functions nlm( ) and lm( ) can also be called up in R via the help function of the program.

An advantageous feature for the analysis is the minimization of the mean absolute error (MAE) of the nonlinear fit function of the curves shown schematically in FIG. 3 in relation to the variance of the measured values from the values calculated by the fit function at the same measurement time.

The present invention further provides for the use of the method of the invention for quality control in the continuous production of superabsorbents.

The present invention further provides for the use of the method of the invention for characterization of a superabsorbent in the development of new superabsorbents.

The present invention further provides a measurement apparatus for performance of measurements by the method of the invention.

Test Methods

The standard test methods designated "NWSP" that follow are described in: "Nonwovens Standards Procedures", 2015 edition, published jointly by EDANA (European Disposables and Nonwovens Association, Avenue Herrmann Debroux 46, 1160 Brussels, Belgium, www.edana.org) and INDA (Association of the Nonwoven Fabrics Industry, 1100 Crescent Green, Suite 115, Cary, North Carolina 27518, U.S.A., www.inda.org). This publication is obtainable both from EDANA and from INDA.

Centrifuge Retention Capacity (CRC)

The centrifuge retention capacity of the superabsorbent is determined to standard test method No. NWSP 241.0 R2 (15) "Gravimetric Determination of the Fluid Retention Capacity in Saline Solution after Centrifugation".

Particle Size Distribution

The particle size distribution of the superabsorbent is determined by standard test method No. NWSP 220.0 R2 (15) "Determination of the Particle Size Distribution by Sieve Fractionation".

Flow Rate (FLR) and Apparent Bulk Density (ABD)

Flow rate and bulk density are determined by standard test method No. NWSP 251.0.R2 (15) "Gravimetric Determination of Flow Rate and Bulk Density".

Permeability (SFC, "Saline Flow Conductivity")

The permeability of a swollen gel layer formed by the superabsorbent as a result of liquid absorption is determined under a pressure of 0.3 psi (2068 Pa), as described in EP 0 640 330 A1, as the gel layer permeability of a swollen gel layer of superabsorbent particles, the apparatus described in the aforementioned patent application on page 19 thereof and in FIG. 8 thereof being modified to the effect that the glass frit (40) is not used, and the plunger (39) consists of the same polymer material as the cylinder (37) and now comprises 21 bores of equal size distributed homogeneously over the entire contact area. The procedure and evaluation of the measurement remain unchanged from EP 0 640 330 A1, except for the starting weight of the superabsorbent: rather than 0.9 g, 1.5 g of sample per measurement is used. The flow is detected automatically.

The permeability (SFC) is calculated as follows:

$$SFC[cm^3 \cdot s/g] = (Fg(t=0) \cdot L0)/(d \cdot A \cdot WP),$$

where $Fg(t=0)$ is the flow of NaCl solution in g/s, which is obtained by a linear regression analysis of the $Fg(t)$ data of the flow determinations by extrapolation to $t=0$, L0 is the thickness of the gel layer in cm, d is the density of the NaCl solution in $g/cm^3$, A is the area of the gel layer in $cm^2$, and WP is the hydrostatic pressure over the gel layer in $dyn/cm^2$.

EXAMPLES

Example 1: Determination of SFC and T20 for a Superabsorbent Surface Postcrosslinked to Different Degrees The parameters sought in example 1 are SFC and T20. These parameters are dependent on the permeability of the superabsorbent. Different permeability was generated here by different degrees of completeness of surface postcrosslinking of a superabsorbent.

A commercial polyacrylate superabsorbent base polymer having the following properties was used:

CRC: 34.2 g/g
AAP 0.3 psi: 15.6 g/g (measured to NWSP 242.0.R2 (15))
ABD: 0.59 g/cm³
FLR: 9.86 g/sec
Particle Size Distribution:
>850 μm: 0% by wt.
710-850 μm: 0.7% by wt.
600-710 μm: 6.0% by wt.
500-600 μm: 18.5% by wt.
400-500 μm: 29.2% by wt.
300-400 μm: 22.6% by wt.
200-300 μm: 15.1% by wt.
150-200 μm: 6.7% by weight
<150 μm: 1.2% by wt.

This base polymer was surface postcrosslinked as follows:

1196 g of the base polymer formed an initial charge in a paddle drier of capacity 5 l, model M5RMK from Gebr. Lödige Maschinenbau GmbH; Elsener Strasse 7-9, 33102 Paderborn, Germany, and was stirred at 200 revolutions per minute. By means of a two-phase nozzle, a solution of 0.07% by weight of N-hydroxyethyl-2-oxazolidone, 0.532% by weight of isopropanol, 2.128% by weight of water, 0.07% by weight of propane-1,3-diol, 0.70% by weight of propane-1,2-diol and 0.50% by weight of aluminum lactate, based in each case on the weight of the initial charge of base polymer, was sprayed onto the stirred polymer within 62 seconds.

The base polymer thus sprayed was transferred into a Pflugschar® M5R plowshare mixer of capacity 5 l, model VT MSR, with a heating jacket from Gebr. Lödige Maschinenbau GmbH; Elsener Strasse 7-9, 33102 Paderborn, Germany. The temperature of the product in the mixer was measured by introducing a thermocouple into the opening provided for the purpose in the mixer to such an extent that its tip was at a distance from the heated inner wall of the mixer and was within the product, but could not be impacted by the mixing tools. The polymer was stirred here at 50 revolutions per minute. Oil heated externally to 250° C. flowed through the heating jacket of the mixer. The product reached the desired reaction temperature of 175-184° C. after about 15 minutes and was surface postcrosslinked in the process. After defined reaction times—measured from the juncture of product transfer into the heatable mixer—samples were taken and freed of lumps by means of a 700 μm screen.

The samples were analyzed. The AAP values were ascertained in accordance with the invention, in principle analogously to NWSP 242.0.R2 (15) (starting weight 0.90 g, test cell with diameter 60 mm). However, after a measurement duration of 60 minutes to ascertain AAP 0.7 psi, the weight was reduced, such that, after the AAP 0.7 psi, the AAP 0.3 psi was determined—again over a measurement duration of 60 minutes. Thereafter, the weight was decreased, such that, after the AAP 0.3 psi, the AAP 0.0 psi was determined—again over a measurement duration of 60 minutes. In addition, a base construction as shown in FIG. 1 was used, with a perforated Plexiglas plate of thickness 6 mm and diameter 89.5 mm, and with 52 holes, each of diameter 2 mm, arranged in concentric circles. The filter paper to be arranged between perforated plate and test cell was omitted; instead, a black band filter paper was placed onto the sample in the test cell. The plunger used was provided on its underside with parallel grooves of width and depth 2 mm, spaced apart by 2 mm. The test cell was supplied with physiological saline solution via a reservoir bottle, vented by a capillary, through a 6 mm silicone hose, and the amount of liquid absorbed was determined as a function of the measurement time by means of a balance on which the reservoir bottle stood. The AAP values of the superabsorbent were determined as the mass of liquid absorbed at the end of the measurement time; the value reported in each case is the average of a double measurement.

The SFC values of the samples were determined as described above, and the T20 values as per the "K(t) Test Method (Dynamic Effective Permeability and Uptake Kinetics Measurement Test Method)" described in EP 2 535 027 A1 on pages 13 to 18.

The results are collated in table 1.

TABLE 1

| Reaction duration [min] | AAP 0.7 psi [g/g] | AAP 0.3 psi [g/g] | AAP 0.0 psi [g/g] | AAP 0.0 psi – AAP 0.7 psi | SFC $[10^{-7}$ cm$^3$s/g] | T20 [s] |
|---|---|---|---|---|---|---|
| 25 | 11.9 | 26.1 | 50.4 | 38.5 | 0 | 1185 |
| 30 | 20.7 | 28.2 | 50.0 | 29.3 | 0 | 258 |
| 35 | 24.9 | 30.1 | 49.8 | 24.9 | 5 | 182 |
| 40 | 24.8 | 30.0 | 47.3 | 22.5 | 29 | 168 |
| 45 | 25.3 | 30.3 | 46.9 | 21.6 | 47 | 161 |
| 50 | 25.3 | 29.9 | 46.0 | 20.7 | 66 | 179 |

Table 1 shows how the surface postcrosslinking reaction proceeds over the reaction time and the permeability of the superabsorbent rises as a result (elevated SFC and reduced T20). Table 1 also shows, in the range in which there is actually measurable permeability (measured as SFC), a linear correlation between SFC and the magnitude of the difference of AAP 0.0 psi and AAP 0.7 psi (=AAP 0.0 psi minus AAP 0.7 psi). In the case of T20, there is likewise a correlation with this magnitude of the difference in AAP, provided that the superabsorbent has not yet attained its final T20 value. By the method of the invention, it is accordingly possible using correlations thus ascertained for types of superabsorbent to replace the laborious determination of values such as SFC or T20 (or else other comparable values) with the readily automatable inventive determination of AAP values.

Example 2: Determination of the SFC Parameter on Various Superabsorbents

For the different superabsorbents listed in table 2 (all available from BASF SE, Carl-Bosch-Strasse 38, 67056 Ludwigshafen, Germany), as described in example 1, swelling curves as shown schematically in FIG. 3 were ascertained, except that the reduction in weight was undertaken by taking away partial weights by means of a robot arm. In addition, CRC and SFC of all samples were additionally measured by the previously known method described above, but the SFC here with a sample weight of 0.9 g.

The values ascertained are collated in table 2. "aAAP" represents the AAP ascertained in accordance with the invention at the given pressure, and τ with specification of a pressure value represents the characteristic swelling time ascertained from the same measurement at the pressure specified.

Figure 4:
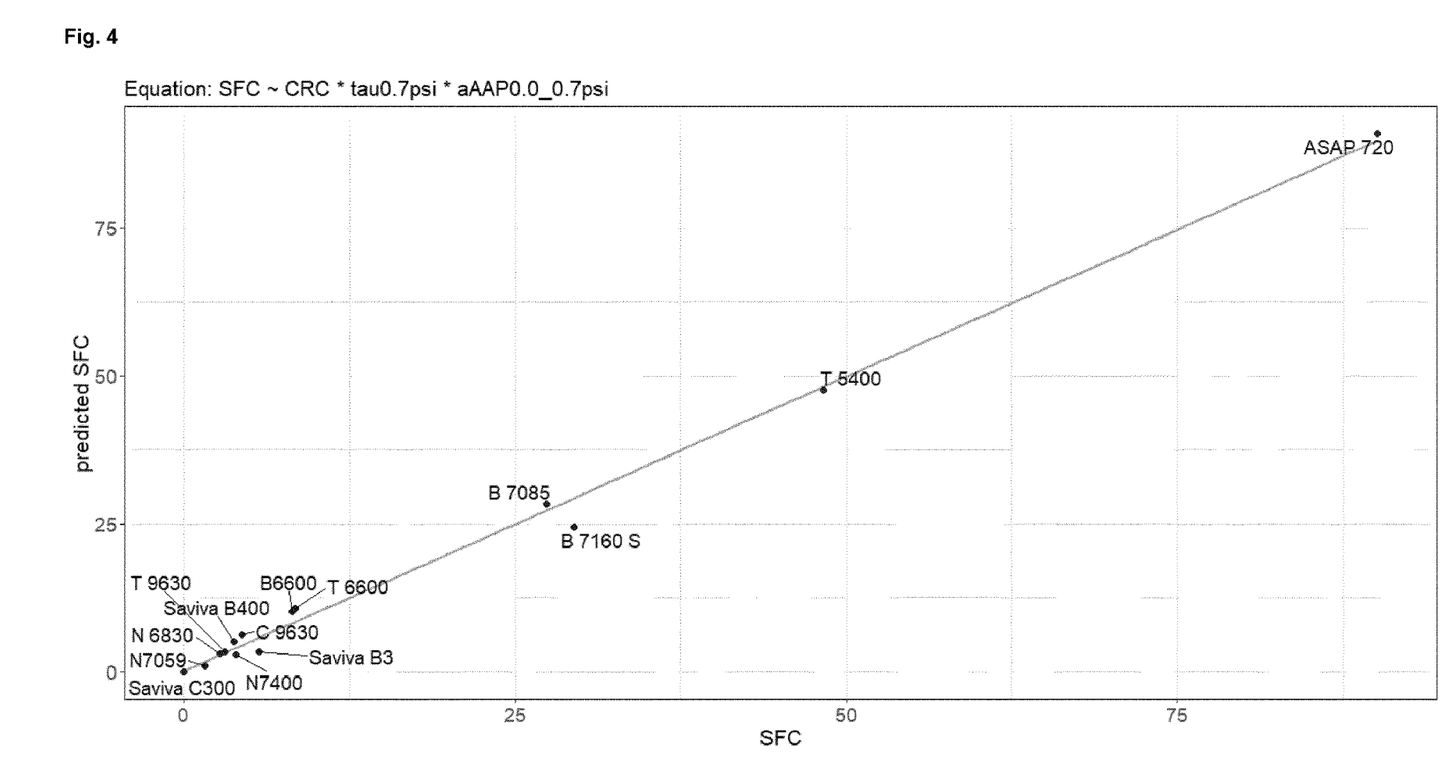
FIGS. 4 and 5 are graphs of predicted gel strength ($G_e$) vs. ($G_e$).

The data were evaluated with the above-described program R, and the CRC determined in the previously known manner, the AAP 0.7 psi determined in accordance with the invention, and the swelling time τ 0.7 psi determined in accordance with the invention from the swelling for the measurement of the AAP 0.7 psi were used to calculate an SFC correlated to the SFC measured. The formula used for the calculation of this predicted SFC in table 2 is: SFC~CRC*(aAAP 0.0 psi-aAAP 0.7 psi)*τ0.7 psi. The correlation ascertained is shown in FIG. 4. The correlation coefficient $r^2$ is 0.99. (With a similarly good correlation coefficient ($r^2$=0.97), it is possible to ascertain the correlation on replacement of the swelling time τ 0.7 psi used here by the swelling time τ 0.3 psi.) What is meant here and hereinafter by correlation coefficient $r^2$ is always the "adjusted $r^2$" of the program R.

Example 2 shows that parameters such as the SFC here, even in the case of different superabsorbents having significantly or even very significantly different properties, can be ascertained efficiently in accordance with the invention and in a routine and automated manner with a minimal degree of complexity compared to previously known SFC measurements.

Example 3: Determination of Gel Strength $G_e$

For the superabsorbents used in example 2, the properties necessary for calculation of gel strength $G_e$ and gel bed porosity $\phi_0$ by the previously known method according to Buchholz were measured manually by previously known methodology. Table 3 gives an overview of the values.

Figure 5:
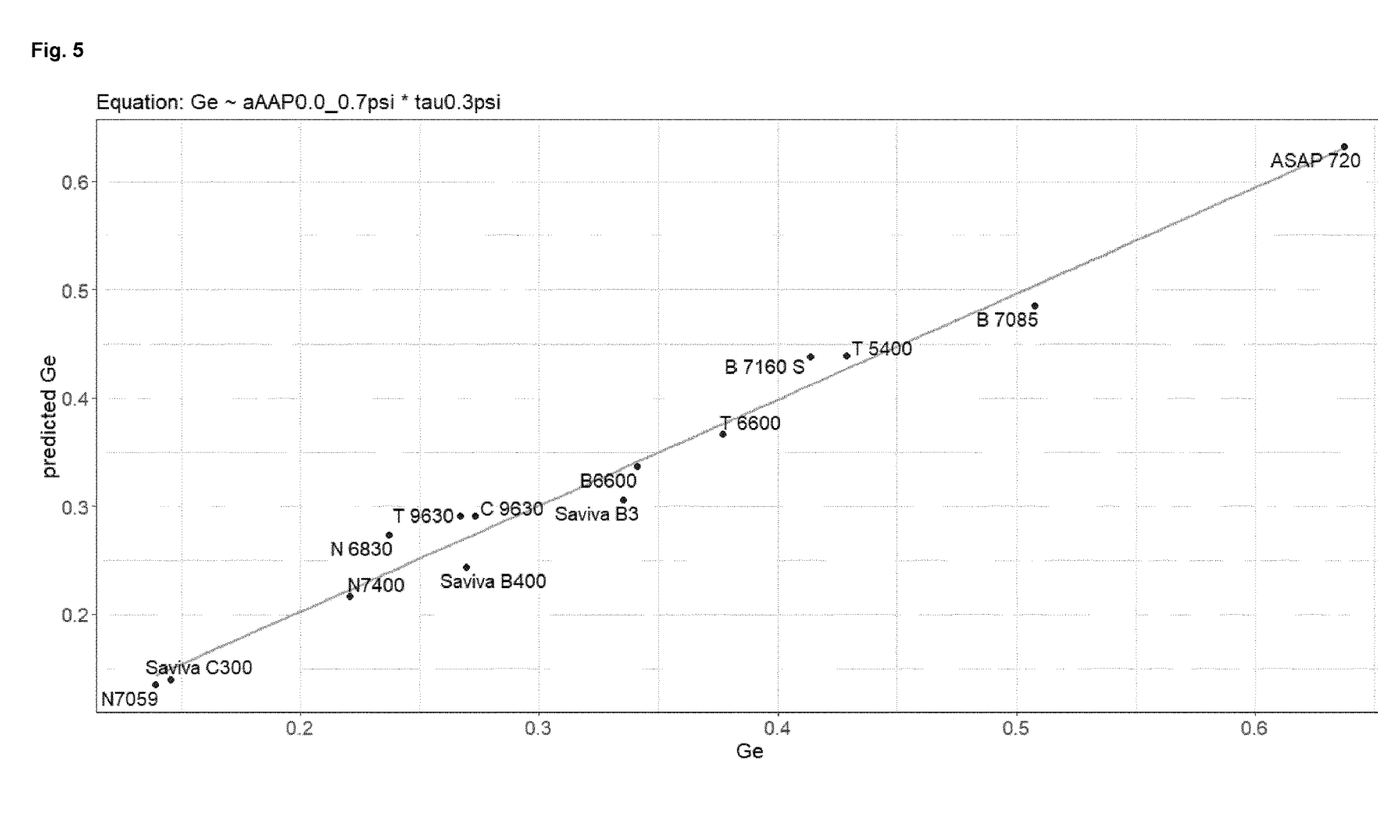

The values determined in accordance with the invention for these superabsorbents were used in accordance with the invention, by correlation, to ascertain values of gel strength $G_e$ and gel bed porosity $\phi_0$. These values are reproduced in table 4. The formula used in R was $G_e$~(aAAP 0.0 psi-aAAP 0.7 psi)*τ 0.3 psi. FIG. 5 shows the correlation. The correlation coefficient $r^2$ is 0.97.

Example 3 shows that parameters such as gel strength that are obtainable only laboriously by previously known methodology can be determined in quite a simple manner in accordance with the invention.

TABLE 2

| Superabsorbent | CRC [g/g] | aAAP 0.0 psi [g/g] | aAAP 0.3 psi [g/g] | aAAP 0.7 psi [g/g] | aAAP 0.0 psi – aAAP 0.7 psi [g/g] | τ 0.3 psi [sec] | τ 0.7 psi [sec] | SFC $[10^{-7}$ cm$^3$s/g] | predicted SFC $[10^{-7}$ cm$^3$s/g] |
|---|---|---|---|---|---|---|---|---|---|
| HySorb ® C 9630 | 33.6 | 49.7 | 28.9 | 21.3 | 28.4 | 1087 | 544 | 4 | 6 |
| HySorb ® T 9630 | 35.0 | 52.0 | 30.3 | 23.0 | 29.0 | 1050 | 484 | 3 | 3 |
| HySorb ® T 6600 | 33.9 | 48.8 | 29.2 | 22.9 | 25.9 | 1031 | 400 | 8 | 11 |
| HySorb ® B 7085 | 30.1 | 44.2 | 28.8 | 23.2 | 21.1 | 1007 | 526 | 27 | 28 |
| HySorb ® B 7160 S | 31.9 | 45.4 | 28.3 | 22.3 | 23.1 | 1012 | 428 | 29 | 25 |
| HySorb ® B6600 | 34.4 | 47.0 | 28.4 | 21.8 | 25.3 | 1138 | 434 | 8 | 10 |
| ASAP ® 720 | 26.8 | 47.2 | 30.4 | 25.7 | 21.6 | 682 | 206 | 90 | 91 |
| HySorb ® T 5400 | 27.4 | 49.0 | 29.0 | 23.0 | 26.0 | 842 | 168 | 48 | 48 |
| HySorb ® N 6830 | 34.4 | 51.9 | 29.1 | 21.7 | 30.1 | 1030 | 520 | 3 | 3 |

TABLE 2-continued

| Superabsorbent | CRC [g/g] | aAAP 0.0 psi [g/g] | aAAP 0.3 psi [g/g] | aAAP 0.7 psi [g/g] | aAAP 0.0 psi – aAAP 0.7 psi [g/g] | $\tau$ 0.3 psi [sec] | $\tau$ 0.7 psi [sec] | SFC [$10^{-7}$ cm$^3$s/g] | predicted SFC [$10^{-7}$ cm$^3$s/g] |
|---|---|---|---|---|---|---|---|---|---|
| HySorb ® N7400 | 35.9 | 53.1 | 29.9 | 21.5 | 31.6 | 1114 | 600 | 4 | 3 |
| HySorb ® N7059 | 38.7 | 53.5 | 27.0 | 19.0 | 35.0 | 1174 | 591 | 2 | 1 |
| SAVIVA ® C300 | 40.2 | 55.9 | 28.4 | 18.1 | 37.7 | 773 | 771 | 0 | 0 |
| SAVIVA ® B3 | 38.1 | 53.2 | 32.9 | 25.1 | 28.1 | 1063 | 592 | 6 | 3 |
| SAVIVA ® B400 | 41.7 | 57.8 | 35.0 | 26.5 | 31.2 | 1047 | 734 | 4 | 5 |

TABLE 3

| Superabsorbent | CRC [g/g] | AAP 0.0 psi [g/g] | AAP 0.3 psi [g/g] | AAP 0.7 psi [g/g] | $\Phi_0$ | $G_e$ [psi] |
|---|---|---|---|---|---|---|
| HySorb ® C 9630 | 33.6 | 47.7 | 29.6 | 20.0 | 0.30 | 0.27 |
| HySorb ® T 9630 | 35.0 | 48.7 | 30.7 | 20.2 | 0.28 | 0.27 |
| HySorb ® T 6600 | 33.9 | 49.8 | 31.9 | 24.6 | 0.32 | 0.38 |
| HySorb ® B 7085 | 30.1 | 39.7 | 28.7 | 23.4 | 0.24 | 0.51 |
| HySorb ® B 7160 S | 31.9 | 41.7 | 29.0 | 23.0 | 0.24 | 0.41 |
| HySorb ® B6600 | 34.4 | 46.7 | 31.0 | 22.8 | 0.26 | 0.34 |
| ASAP ® 720 | 26.8 | 44.9 | 30.6 | 25.0 | 0.40 | 0.64 |
| HySorb ® T 5400 | 27.4 | 45.9 | 28.7 | 21.5 | 0.40 | 0.43 |
| HySorb ® N 6830 | 34.4 | 50.7 | 30.6 | 18.1 | 0.32 | 0.24 |
| HySorb ® N7400 | 35.9 | 48.9 | 30.1 | 18.3 | 0.27 | 0.22 |
| HySorb ® N7059 | 38.7 | 49.4 | 28.6 | 14.4 | 0.22 | 0.14 |
| SAVIVA ® C300 | 40.2 | 56.2 | 31.0 | 15.3 | 0.28 | 0.15 |
| SAVIVA ® B3 | 38.1 | 50.7 | 33.4 | 25.4 | 0.25 | 0.34 |
| SAVIVA ® B400 | 41.7 | 54.2 | 34.6 | 24.9 | 0.23 | 0.27 |

TABLE 4

| Superabsorbent | CRC [g/g] | aAAP 0.0 psi [g/g] | aAAP 0.7 psi [g/g] | aAAP 0.0 psi – aAAP 0.7 psi [g/g] | $\tau$ 0.3 psi [sec] | $\Phi_0$ | predicted $G_e$ [psi] |
|---|---|---|---|---|---|---|---|
| HySorb ® C 9630 | 33.6 | 49.7 | 21.3 | 28.4 | 1087 | 0.30 | 0.29 |
| HySorb ® T 9630 | 35.0 | 52.0 | 23.0 | 29.0 | 1050 | 0.28 | 0.29 |
| HySorb ® T 6600 | 33.9 | 48.8 | 22.9 | 25.9 | 1031 | 0.32 | 0.37 |
| HySorb ® B 7085 | 30.1 | 44.2 | 23.2 | 21.1 | 1007 | 0.24 | 0.49 |
| HySorb ® B 7160 S | 31.9 | 45.4 | 22.3 | 23.1 | 1012 | 0.24 | 0.44 |
| HySorb ® B6600 | 34.4 | 47.0 | 21.8 | 25.3 | 1138 | 0.26 | 0.34 |
| ASAP ® 720 | 26.8 | 47.2 | 25.7 | 21.6 | 682 | 0.40 | 0.63 |
| HySorb ® T 5400 | 27.4 | 49.0 | 23.0 | 26.0 | 842 | 0.40 | 0.44 |
| HySorb ® N 6830 | 34.4 | 51.9 | 21.7 | 30.1 | 1030 | 0.32 | 0.27 |
| HySorb ® N7400 | 35.9 | 53.1 | 21.5 | 31.6 | 1114 | 0.27 | 0.22 |
| HySorb ® N7059 | 38.7 | 53.5 | 19.0 | 35.0 | 1174 | 0.22 | 0.13 |
| SAVIVA ® C300 | 40.2 | 55.9 | 18.1 | 37.7 | 773 | 0.28 | 0.14 |
| SAVIVA ® B3 | 38.1 | 53.2 | 25.1 | 28.1 | 1063 | 0.25 | 0.31 |
| SAVIVA ® B400 | 41.7 | 57.8 | 26.5 | 31.2 | 1047 | 0.23 | 0.24 |

The invention claimed is:

1. A method of measuring an absorption capacity of a superabsorbent under pressure, comprising applying a pressure to a sample of a superabsorbent; reducing the pressure applied to the sample of the superabsorbent stepwise during a measurement; and determining an absorption capacity at the applied pressure and at each reduced pressure and a dependence thereof during the measurement duration.

2. The method according to claim 1, wherein a progression of absorption under pressure against time is used to calculate a swelling constant k or a characteristic swelling time $\tau$.

3. The method according to claim 1, wherein a magnitude of a difference in the absorption capacity at two different pressures is determined.

4. The method according to claim 3, wherein the magnitude of the difference in the absorption capacity at a non-zero pressure and without pressure is determined.

5. The method according to claim 2, wherein the swelling constant k or the characteristic swelling time $\tau$ or the difference in the absorption capacity is used to calculate at least one further parameter of the superabsorbent by means of a correlation measured beforehand between the swelling constant k, the characteristic swelling time $\tau$ or the magnitude of the difference in the absorption capacity and the parameter.

6. The method according to claim 5, wherein the parameter is a T20 value or a permeability (SFC) or a gel strength $G_e$.

7. The method according to claim 1, wherein the pressure applied is 49 g/cm$^2$ at first and is reduced stepwise to 21 g/cm$^2$ and 0 g/cm$^2$.

8. The method according to claim 1, wherein the period over which a particular pressure is applied on the sample is at least 30 minutes and at most 90 minutes.

9. The method according to claim 1, wherein the sample of the superabsorbent used is from 0.5 to 5 g.

10. The method according to claim 9, wherein the sample of the superabsorbent covers a circular area having a diameter of 5 to 7 cm.

11. The method according to claim 1, wherein at least 95% by weight of the superabsorbent has a grain size in the range from 100 μm to 1000 μm.

12. The method according to claim 1, wherein the superabsorbent has a saline flow conductivity (SFC) of at least $10 \times 10^{-7}$ cm$^3$ s/g.

13. The method according to claim 1, wherein the superabsorbent has a centrifuge retention capacity (CRC) of at least 10 g/g.

14. The method according to claim 1 for quality control in a continuous production of a superabsorbent.

15. The method according to claim 1 for characterization of a superabsorbent in a development of a new superabsorbent.

16. An apparatus for performing the method according to claim 1.

\* \* \* \* \*